July 19, 1949.  A. M. ROOT, JR  2,476,431
HEATING DEVICE FOR MELTING RUBBERIZED
BITUMINOUS COMPOSITIONS
Filed March 26, 1947                                     2 Sheets-Sheet 2
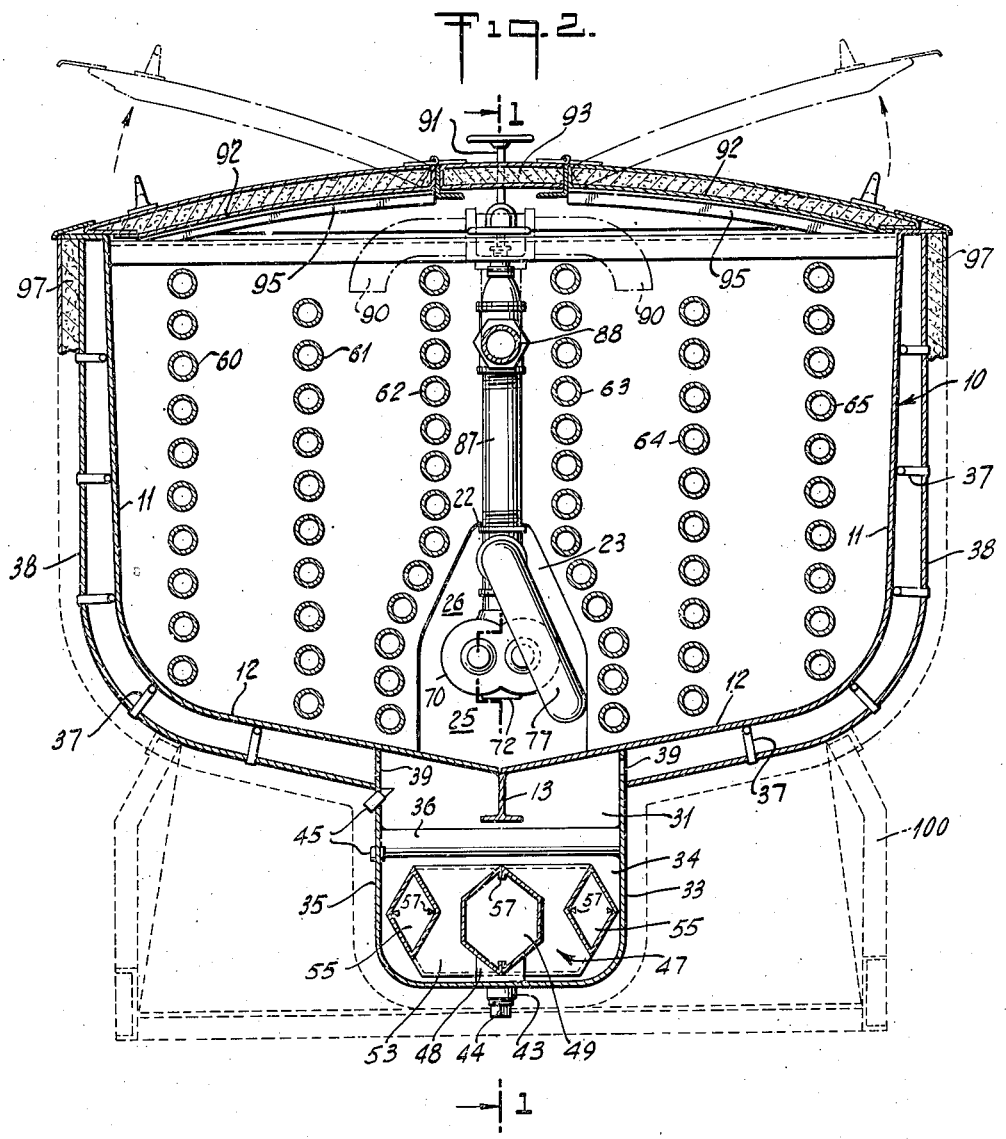
INVENTOR.
ARTHUR M. ROOT JR.
BY
ATTORNEY.

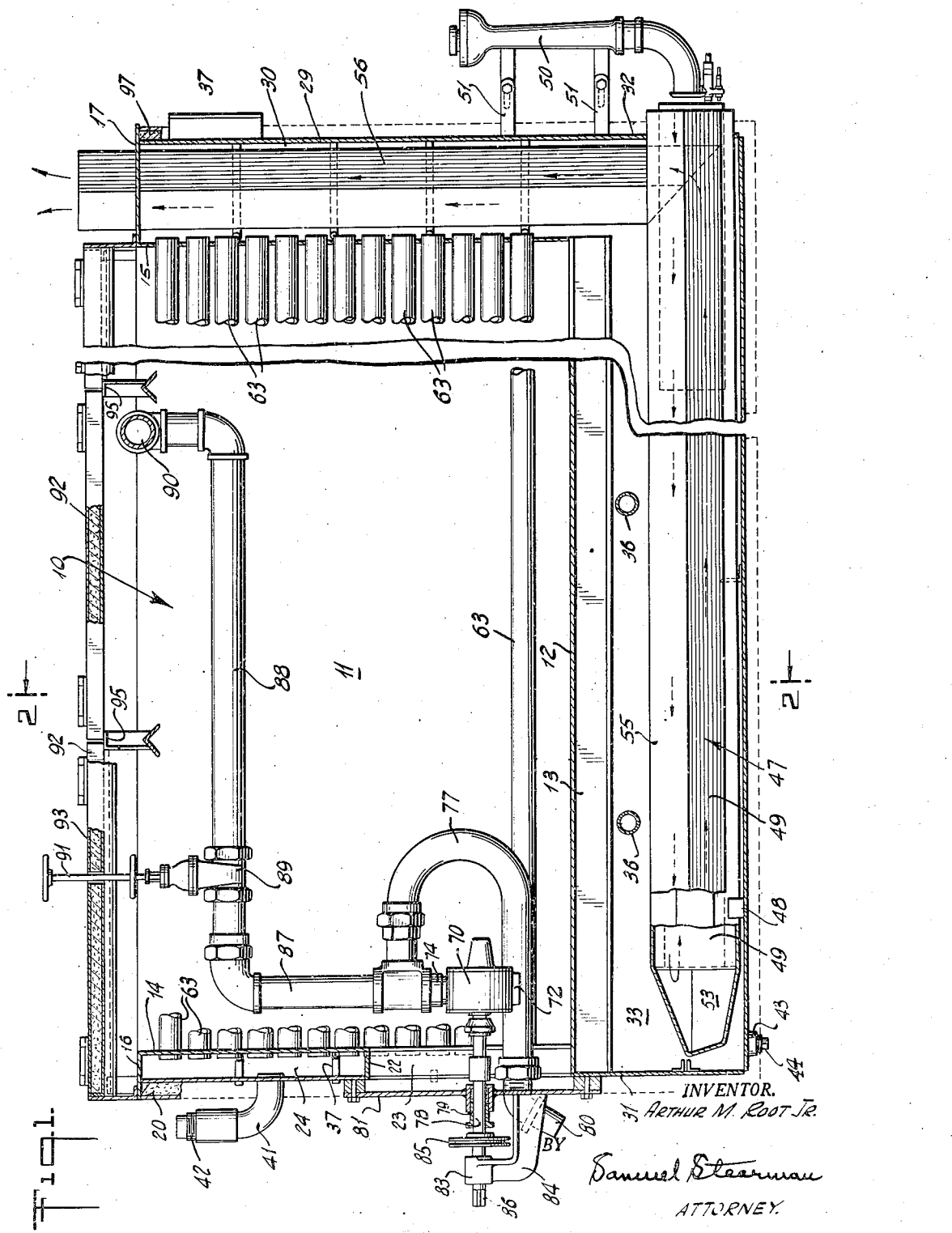

Patented July 19, 1949

2,476,431

UNITED STATES PATENT OFFICE 2,476,431

HEATING DEVICE FOR MELTING RUBBERIZED BITUMINOUS COMPOSITIONS

Arthur M. Root, Jr., Rutherford, N. J., assignor to The Patent and Licensing Corporation, New York, N. Y., a corporation of Massachusetts Application March 26, 1947, Serial No. 737,296

4 Claims. (Cl. 126—343.5)

This invention relates to a heating device for heating and melting normally solid thermoplastic materials. Although not necessarily confined thereto, the invention is particularly concerned with a device for heating rubberized bituminous compounds, particularly of the types employed for sealing the joints in concrete.

In the construction of concrete runways of airports and concrete highways, the joints between concrete sections are provided with filler strips serving as expansion and contraction joints, and a sealing compound is applied over the filler strip in order that the joint shall be effectively sealed against infiltration of moisture. For that purpose, it is necessary that the joint sealing compound be resilient and sufficiently adhesive with respect to the concrete so that there will be no failure of the bond between the sealer and the concrete during cycles of expansion and contraction under the atmospheric conditions encountered in service. The compounds that have been developed for that purpose accordingly comprise mixtures of bituminous materials and rubber, the rubber constituting generally about 20 to 30% by weight of the compound, and being blended with the bitumen while the latter is maintained in a fluid molten condition. These compounds are relatively solid at normal atmospheric temperatures and hence must be heated to relatively high temperatures of the order of 450 to 500° F., to bring them to a state of fluidity such as to enable them to be poured into the joints properly. Usually the pour point, i. e., the temperature at which the material will pour readily and uniformly, is from 410 to 420° F. However, if in heating a batch of the material to reduce it to pourable consistency, any portion of it is permitted to exceed a temperature of about 450° F., the entire batch may be rendered unfit for use.

Because of the nature of these compounds, and owing particularly to the rubbery character thereof, it is exceedingly difficult to reduce them to a suitable pouring consistency without, at the same time, injuriously affecting the physical properties which the compound must possess in order to meet service requirements. The known types of heating kettles and similar heating devices are unsatisfactory for melting these compounds either because of their inability to melt the compound uniformly to satisfactory pouring condition without injury thereto as by the effects of local overheating, or because they are incapable of melting this type of compound at a satisfactory rate of out-put (normally required in practice to be a minimum of 50 gallons per hour), or because they comprise mechanism which render the same costly and cumbersome to employ for this purpose.

The principal object of the invention is to provide a heating device which will be suitable for heating and melting rubberized bituminous compositions of the character referred to, at a rate which is satisfactory for practical use in the field application of this type of material and, which will be capable of melting the compound to pouring consistency without danger of injury to the physical properties thereof.

According to the invention, there is provided a heating device in which melting of the rubberized bituminous composition is effected by indirect heat, the heat transfer medium consisting of the vapors of a liquid material which is vaporizable at relatively low pressures to provide vapors at relatively high temperatures. The heat transfer medium is the material well known as "Dowtherm A," which comprises a mixture of 73.5% diphenyloxide and 26.5% diphenyl. This mixture boils at 500° F. (at atmospheric pressure), and is characterized by a high heat transfer coefficient as well as by the definite temperatures which may be maintained by regulating the pressure of the vapor.

A feature of the invention resides in the arrangement by which the heat from such vapor is transferred to the material to be melted. In the apparatus of my invention, this vapor is brought into indirect heat exchange relationship with the rubberized bituminous composition by distributing the vapor through tubes extending longitudinally through the apparatus and through jackets at the end walls thereof, the tubes being arranged in a plurality of banks spaced from one another at distances sufficient to permit charging between certain of these banks relatively large pieces of the composition, while providing a sufficient number of tubes to ensure a melting rate which enables the apparatus to melt the composition at a rate not less than approximately one-third the cubic capacity of the melting chamber per hour of operation. Thus, a heating device constructed according to my invention and having a cubic capacity of the order of 150 gallons can be operated to melt the rubberized bituminous compositions of the character hereinabove referred to, at a rate not less than 50 gallons per hour.

Another feature of the invention resides in the arrangement of the banks of tubes in relation to the point of discharge of the melted material in a manner to ensure that no material which has not been completely melted will be discharged from the apparatus in admixture with melted material.

Other objects and advantages of the invention will be apparent from the more detailed description, which follows.

In the accompanying drawings:

Fig. 1 is a view partly in section and partly in elevation of a heating device embodying the invention, taken along line 1—1 of Fig. 2.

Fig. 2 is a transverse view partly in elevation and partly in cross section, taken along line 2—2 of Fig. 1.

Referring to the drawings, the numeral 10 designates generally a tank comprising side walls 11 and a curved or upwardly sloping bottom wall 12 supported as by an angle iron 13, and end walls 14 and 15 welded to the side walls inwardly of the ends thereof. The upper end of the end wall 14 may be formed with an outwardly extending flange 16 and the upper end of the end wall 15 may be formed with an outwardly extending flange 17.

The end wall 14 has the flange 16 thereof supported on and secured as by welding to an outer plate 20, likewise welded to the end of the tank, the wall 14 and the plate 20 being provided centrally of and above the bottom of the tank with registering openings joined by a collar 22 along the periphery thereof to provide at one end of the tank an opening 23 surrounded by the sealed vapor space or jacket 24 between the wall 14 and the plate 20. As will be noted from Fig. 2, the opening 23 preferably comprises a lower rectangular portion 25 extending from the bottom wall 12 of the tank and a tapered upper portion 26.

The end wall 15 of the tank has the flange 17 thereof supported on and secured by welding to an outer plate 29 also welded to the adjacent end of the tank so as to provide a sealed jacket 30 at this end of the tank. The portions of the plates 20, 29 extending beneath the bottom wall 12 of the tank are in the form of relatively narrow extensions 31, 32, in longitudinal alignment with one another. A substantially U-shaped plate 33 extends longitudinally beneath the bottom wall of the tank 12 and is secured to the extensions 31 and 32 of the plates 20 and 29 to form therewith a relatively shallow pan 34 in communication with the jackets 24 and 30. The upwardly extending sides 35 of the pan may be braced with respect to each other as by tubular bracing 36 at intervals longitudinally thereof. The jackets 24 and 30 are preferably also reinforced as by means of staybolts 37 welded at suitable intervals to the end walls 14, 15 and the plates 20, 29.

Preferably, though not necessarily, the sides and bottom of the tank are also jacketed, as by plates 38 secured in spaced relation exteriorly thereto. These plates may extend the full height of the tank or only part way up the sides of the tank. Staybolts 37 may also be employed for reinforcing the jacketing at the sides and bottom of the tank. To provide for free communication between the pan 34 and the jackets at the sides and bottom of the tank, the upper margins of the sides of the pan 34 are provided with perforations or scallops 39 at intervals longitudinally thereof.

An inlet pipe 41 normally closed by a threaded plug 42 is connected to the jacket 24 for charging liquid "Dowtherm A" into the pan 34 and an outlet 43 having a threaded plug 44 is formed in the bottom of the pan near one end thereof, for draining the liquid from the well. Pet cocks 45 are preferably also provided for maintaining the desired level of the liquid in the pan.

The liquid in the well is vaporized by means of a fired heating unit submerged therein and comprising a flue construction through which hot combustion gases from a suitable burner may be circulated. The particular form of the flue construction illustrated in the drawings is, per se, not my invention but is a well known form of construction which has been found suitable for use in the apparatus of my invention. This flue construction indicated generally by the numeral 47, is mounted to extend longitudinally of the pan 34, being supported at one end in the plate 29 and adjacent its opposite end on a bracket 48. A central inlet flue 49 receives combustion gases from a burner 50 mounted as by brackets 51 attached to the plate 29. The opposite end of the flue 49 connects through branches 53 with return flues 55 extending parallel with and adjacent to the flue 49. The return flues are connected adjacent the forward end of the inlet flue with flues 56 extending vertically in the jacket 30 for discharging the combustion gases at any desired point above the top of the tank. Desirably, the flues 49 and 55 are formed internally with fins or vanes 57 arranged to induce turbulent flow of the combustion gases therethrough.

It will be understood that, if desired, the vertical flues 56 may be mounted exteriorly of the jacket 30, in which case the latter may be of substantially the same width as the jacket 24.

A plurality of banks of tubes are arranged in the tank 10, to be in communication with the pan 34 through the jackets 24 and 30. As illustrated, there are six such banks of tubes indicated at 60, 61, 62, 63, 64 and 65. It is a feature of the invention that by reason of the high heat transfer coefficient of the heat transfer medium herein referred to, the banks of tubes 60, 61 and 62, and likewise, the banks of tubes 63, 64 and 65 may be spaced, at least at the upper ends thereof, at distances sufficient to permit charging relatively large size pieces (weighing, say, 10 to 20 pounds) of the material to be melted between adjacent pairs of these banks, and yet provide sufficient heat transfer surface for rapid and uniform melting of the material. Thus, in actual practice, the upper ends of the banks of tubes 60, 61 and 62 may be spaced on approximately 8" centers and similar spacing may be used between the banks of tubes 63, 64 and 65. However, as will be seen from Fig. 2, the banks 62 and 63 each include a number of tubes near the lower ends thereof which are positioned in offset relation to the vertical alignment of the remaining tubes of these two banks, in conformity with the contour of the annular opening 23 in the end wall 14 of the tank.

The tubes are welded or otherwise secured in openings provided in the end walls 14, 15 of the tank so as to be in vapor-sealed communication with the jackets 24 and 30.

It is a feature of the invention that the vertical spacing between the tubes in the banks 62, 63 is such as to prevent material that is not fully melted from passing into the discharge, which is located intermediate the banks 62, 63. For this purpose, I have found from a practical standpoint that the tubes of the banks 62, 63 should be located on centers such that the spaces or clearance between the outer peripheral surfaces of each adjacent pair of tubes in these banks does not exceed ¾", and preferably should be about ⅝". With this spacing, any unmolten pieces of the compound which may pass between the tubes of these two banks will be small enough to become completely melted in the hot molten mass of material before being discharged from the tank. It will be understood that spacing less than ⅝", although desirable for the purpose stated, would not normally be practical when the tubes are secured in place by welding, because of the partial overlapping of the welds that would thus ensue.

It will be noted from Fig. 2, that the spacing between the tubes of the banks 62, 63 is less than that between the tubes in the other banks. Although this is the preferred arrangement, it will be understood that the spacing between the tubes of the banks 60, 61, 64 and 65 may be the same as that between the tubes of banks 62, 63, if desired, in order to accommodate an additional tube in the banks 60, 61, 64 and 65, to provide additional heat transfer surface.

The molten material is discharged from the tank by positive pressure means, which in the particular arrangement illustrated comprises a gear pump 70 located adjacent the bottom of the tank intermediate the tube banks 62, 63. The inlet of the pump is indicated at 72, and its outlet, indicated at 74, is connected to a reversely bent discharge pipe 77 extending outwardly through the opening 23. The shaft 78 of the pump extends through a stuffing box 79 secured to a plate 81 for covering the opening 23, the outer end of the shaft being received in a bearing 83 carried by a bracket 84 secured to the plate 81. A pulley 85 may be fastened to the pump shaft for driving the pump or the pump shaft may be manually operated by a crank handle fitted on the outer keyed end 86 of the shaft.

Thus, the pump and the discharge pipe 77, together with the plate 81 carrying the pump shaft, constitutes an assembly removable as a unit from the heater, for the purpose of cleaning or repairing the pump.

Desirably also, the outlet 74 of the pump may be connected by pipe 87 to a pipe 88 extending longitudinally of the tank adjacent the upper portion thereof and controlled by a valve 89 to permit circulation from time to time of the molten material within the tank, the material being discharged through lateral extensions 90 into the charging lanes, i. e., in the spaces between tube banks 61, 62 and 63, 64. A handle 91 for operating the valve 89 extends upwardly above the top of the tank.

The top of the tank is provided with sectional covers 92 hinged at one edge to the longitudinal edges of a fixed cover member 93. The cover member is of a transverse width to span the space between the innermost banks of tubes 62, 63 so as to prevent any of the pieces of the material to be melted from being charged into the space between these two banks of tubes. Angle irons 95 may be provided to support the covers 92 in their closed position.

To avoid undue dissipation of heat from the heating device, insulation material as indicated at 97 may be applied to the outer surface of the plates 20, 29 and 38, and also to the outer surfaces of the pan 34 and the cover portions 92, 93.

The apparatus as above described may be supported on suitable framework 100 arranged so that the same may be mounted upon the chassis of a suitable vehicle for transporting it to the point of use. The vehicle may likewise carry fuel for the burner 50, such as commercially available tanks of compressed propane gas.

In the use of the device for melting rubberized bituminous compositions of the character suitable as sealers for concrete joints, liquid "Dowtherm A" in the pan 34 is heated by the submerged heating flue assembly 47 to generate vapor therefrom at a temperature of from 480 to 520° F. It will be understood that a thermostatically controlled valve (not shown) for regulating the flow of fuel to the burner 50 may be provided for controlling the temperature of the vapor within the desired limits. Suitable pressure relief mechanism (not shown) may be connected to the vapor space. The "Dowtherm" vapor provides a temperature of 480° F. at a pressure of 12 pounds per square inch (absolute) corresponding to vacuum of 6" of mercury, a temperature of 500° F. at a pressure of 15 pounds per square inch (absolute) or zero gage pressure and a temperature of 520° F. at a pressure of 19 pounds per square inch (absolute) or 4 pounds gage pressure.

The desired vapor temperature having been developed, the thermoplastic rubberized bituminous composition is gradually charged in successive pieces which may weigh from say 10 to 20 pounds each, into the spaces between the upper ends of the tube banks 60, 61, 62 and also the spaces between the banks 63, 64, 65. As these pieces become substantially melted down by the transfer of heat from the vapor in the tubes and in the jackets of the tank, additional pieces of the composition may be charged into the tank until the desired level of the molten material is attained.

By virtue of the high heat transfer coefficient of this vapor, uniform and rapid application of heat to the material is effected, so as to bring it to a pourable consistency. Usually this requires that the material attain a temperature well above 400° F. However, if any portion of the material reaches a temperature in excess of about 450° F., the entire batch may be rendered useless as a concrete joint sealer. By reason of the close control of the temperature of the vapor herein employed as the heat transfer medium, the temperature of the composition in the tank can be held within limits to prevent injury thereto by local overheating.

As the material in the tank softens and becomes fluid, the fluid portions gradually flow through the space between the tubes in the several banks towards the transverse center of the tank. Thus, melted material reaching the inlet of the discharge pump 70 is compelled to flow through the spaces between the tubes of the banks 62 and 63. As already indicated, these spaces do not exceed a transverse dimension of ¾". Thus, such small pieces of unmolten material as may pass therethrough will be reduced to completely melted condition in the molten mass passing beyond the tube banks 62, 63 to the discharge pump.

When a sufficient level of completely molten material has been built up in the space between the tube banks 62 and 63, desired portions thereof may be discharged from time to time through draw-off pipe 80 by operating the pump 70, the supply of material in the tank being replenished correspondingly by charging additional pieces of the composition to the spaces between the upper ends of the tube banks as abovementioned.

As the melting of the material in the tank proceeds, portions thereof may be circulated from time to time, if desired, by opening the valve 89 in the pipe 88 (the valve of the discharge pipe 80 being normally closed), the circulated material being discharged upon the surface of the mass in the tank through the open ends of the lateral extensions 90 of the pipe 88.

In actual practice, it has been found that a heating device constructed in accordance with the invention and having a normal capacity of approximately 150 gallons of rubberized bituminous composition of the character herein referred to, may be operated so as to deliver the composition in a satisfactory pourable consistency at a rate not less than 50 gallons per hour without overheating or otherwise injuriously affecting its desirable properties, such as might render it unfit for use or incapable of meeting the exacting requirements specified by the user.

I claim:

1. A heating device for melting rubberized bituminous compositions, comprising a tank for receiving the material to be melted, jackets at the opposite ends of the tank, a plurality of spaced substantially vertical banks of tubes extending longitudinally through the tank and in communication with said jackets, the horizontal spacing between said banks being much greater than the vertical spacing between the adjacent tubes of the respective banks, a chamber beneath the bottom of the tank for maintaining a supply of liquid vaporizable at low pressures to provide vapor at temperatures of from 450 to 520° F., said chamber being in commuication with the jackets and the tubes, heating flues extending longitudinally through said chamber for vaporizing the liquid maintained therein and a positive pressure discharge assembly mounted within and adjacent the bottom of the tank intermediate the innermost of said banks of tubes, for intermittently discharging molten material from said tank.

2. A heating device for melting rubberized bituminous compositions, comprising a tank for receiving the material to be melted, jackets at the opposite ends of the tank, a plurality of spaced substantially vertical banks of tubes extending longitudinally through the tank and in communication with said jackets, the horizontal spacing between adjacent pairs of banks of tubes being sufficient to permit feeding the material to be melted therebetween in the form of pieces of substantial size and being much greater than the vertical spacing between the adjacent tubes of the respective banks, a chamber beneath the bottom of the tank for maintaining a supply of liquid vaporizable at low pressures to provide vapor at temperatures of from 450 to 520° F., said chamber being in communication with the jackets and the tubes, heating flues extending longitudinally through said chamber for vaporizing the liquid maintained therein and a positive pressure pump assembly mounted within and adjacent the bottom of the tank intermediate the innermost of said banks of tubes, for intermittently discharging molten material from said tank.

3. A heating device for melting rubberized bituminous compositions, comprising a tank for receiving the material to be melted, jackets at the opposite ends of the tank, a plurality of spaced substantially vertical banks of tubes extending longitudinally through the tank and in communication with said jackets, the horizontal spacing between said banks being much greater than the vertical spacing between the adjacent tubes of the respective banks, a chamber beneath the bottom of the tank for maintaining a supply of liquid vaporizable at low pressures to provide vapor at temperatures of from 450 to 520° F., said chamber being in communication with the jackets and the tubes, heating flues extending longitudinally through said chamber for vaporizing the liquid maintained therein, a positive pressure discharge assembly mounted within and adjacent the bottom of the tank intermediate the innermost of said banks of tubes for intermittently discharging molten material from said tank, the tubes of the banks intermediate which said discharge pump is mounted being vertically spaced from one another at distances not in excess of $3/4''$ so that any pieces of unmolten material passing therethrough will become completely melted before entering the inlet of the discharge pump.

4. A heating device for melting rubberized bituminous compositions, comprising a tank for receiving the material to be melted, jackets at the opposite ends of the tank, a plurality of spaced substantially vertical banks of tubes extending longitudinally through the tank and in communication with said jackets, the horizontal spacing between adjacent pairs of banks of tubes being sufficient to permit feeding the material to be melted therebetween in the form of pieces of substantial size and being much greater than the vertical spacing between the adjacent tubes of the respective banks, a chamber beneath the bottom of the tank for maintaining a supply of liquid vaporizable at low pressures to provide vapor at temperatures of from 450 to 520° F., said chamber being in communication with the jackets and the tubes, heating flues extending longitudinally through said chamber for vaporizing the liquid maintained therein and a positive pressure pump assembly mounted adjacent the bottom of the tank intermediate the innermost of said banks of tubes for intermittently discharging molten material from said tank, the tubes of the banks intermediate which said positive pressure pump assembly is mounted being vertically spaced from one another at distances not in excess of $3/4''$.

ARTHUR M. ROOT, Jr.

REFERENCES CITED

The following references are of record in the file of this patent:

UNITED STATES PATENTS

| Number | Name | Date |
|---|---|---|
| 517,765 | Poche | Apr. 3, 1894 |
| 1,220,344 | Kinney | Mar. 27, 1917 |
| 1,466,637 | Babb | Aug. 28, 1923 |
| 1,468,365 | Johnston | Sept. 18, 1923 |
| 1,579,193 | Chipman | Mar. 30, 1926 |
| 2,055,949 | Sharp | Sept. 29, 1936 |
| 2,360,665 | Fields | Oct. 17, 1944 |

FOREIGN PATENTS

| Number | Country | Date |
|---|---|---|
| 694,967 | Germany | Aug. 13, 1940 |